(12) United States Patent
Begle

(10) Patent No.: US 7,487,001 B2
(45) Date of Patent: Feb. 3, 2009

(54) METHOD, SYSTEM AND COMPUTER PROGRAM PRODUCT FOR COMPUTER-ASSISTED FURNISHING OF MATERIALS IN ELEVATOR CONSTRUCTION

(75) Inventor: Guntram Begle, Küssnacht am Rigi (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/299,753

(22) Filed: Nov. 19, 2002

(65) Prior Publication Data

US 2003/0126037 A1 Jul. 3, 2003

(30) Foreign Application Priority Data

Nov. 30, 2001 (EP) ................... 01811160

(51) Int. Cl.
*G06F 19/00* (2006.01)
(52) U.S. Cl. ...................... 700/106; 700/115
(58) Field of Classification Search ......... 700/106–107, 700/114–117; 705/28, 22–23, 29; 340/825.49, 340/825.4, 5.2, 5.21–5.22, 10.51, 10.52
See application file for complete search history.

(56) References Cited

U.S. PATENT DOCUMENTS

| 3,996,737 | A | * | 12/1976 | Burstall ................... 59/35.1 |
| 4,074,120 | A | | 2/1978 | Allred et al. |
| 4,312,623 | A | * | 1/1982 | Allred et al. ............... 414/807 |
| 6,041,171 | A | | 3/2000 | Blaisdell et al. |
| 6,134,557 | A | | 10/2000 | Freeman |
| 6,182,053 | B1 | * | 1/2001 | Rauber et al. .............. 705/28 |
| 6,483,434 | B1 | * | 11/2002 | UmiKer .................. 340/572.1 |
| 6,549,891 | B1 | * | 4/2003 | Rauber et al. .............. 705/28 |
| 6,567,714 | B2 | * | 5/2003 | O'Connor et al. ........... 700/95 |
| 6,600,418 | B2 | * | 7/2003 | Francis et al. ........... 340/572.1 |
| 6,714,121 | B1 | * | 3/2004 | Moore ...................... 340/10.3 |
| 2002/0070862 | A1 | * | 6/2002 | Francis et al. ........... 340/572.1 |
| 2002/0080032 | A1 | * | 6/2002 | Smith et al. ............. 340/572.1 |
| 2003/0102367 | A1 | * | 6/2003 | Monette et al. ............ 235/376 |
| 2005/0050006 | A1 | * | 3/2005 | Zara et al. .................... 707/1 |

FOREIGN PATENT DOCUMENTS

| EP | 281 142 | 9/1988 |
| JP | 7207946 | 8/1995 |
| JP | 10222568 | 8/1998 |
| JP | 11144012 | 5/1999 |
| PL | 248994 | 2/1986 |
| RU | 94005754 | 6/1996 |
| TW | 424187 | 3/2001 |
| TW | 473677 | 1/2002 |
| TW | 511019 | 11/2002 |
| WO | WO 01/67346 | 9/2001 |
| WO | WO 01/79988 | 10/2001 |
| WO | WO 01/82009 A2 | 11/2001 |

* cited by examiner

*Primary Examiner*—Zolia E Cabrera
(74) *Attorney, Agent, or Firm*—Wolff & Samson PC

(57) ABSTRACT

A method, a system and a computer program product for computer-assisted furnishing of materials in elevator construction, wherein materials are provided with a readable or writable data transmitter, these materials are furnished, data of the data transmitter are written or read with computer assistance and these data are checked with computer assistance.

2 Claims, 1 Drawing Sheet

METHOD, SYSTEM AND COMPUTER PROGRAM PRODUCT FOR COMPUTER-ASSISTED FURNISHING OF MATERIALS IN ELEVATOR CONSTRUCTION

BACKGROUND OF THE INVENTION

The invention relates to a method, a system and a computer program product for computer-assisted furnishing of materials in elevator construction.

In elevator construction, elevator installations are installed or modernized at a building site. For this purpose materials are furnished pursuant to a method. By furnishing of materials there is understood a complete net product chain consisting of order processing, manufacture, supply, commissioning, delivery, mounting and maintenance of materials. Materials are fabricated at the most diverse suppliers and delivered as packages to the wholesale warehouse. The wholesaling, i.e. assembly of materials on pallets and supply of pallets to the building site is carried out from wholesale warehouses. The materials are mounted in elevator installations. Materials incorporated in elevator installations are serviced. A disadvantage of this method is that in the production of the materials at the suppliers the materials are not able to be clearly associated and identified, which is of particular significance for the purposes of quality control.

Moreover, it is disadvantageous that the packages supplied to the wholesale warehouse have to be opened for the purpose of checking content.

It is also disadvantageous that the localization of individual materials in the delivered pallets at the building site is time-consuming.

In addition, it is disadvantageous that the identification of the delivered or incorporated materials is not clear.

Furthermore it is disadvantageous that the mounting of the delivered materials is susceptible to error and, in the case of inattention, materials are incorrectly installed.

Finally, it is disadvantageous that the identification of replacement parts in maintenance is prone to error and is time-consuming.

SUMMARY OF THE INVENTION

The object of the present invention is to provide a method, a system and a computer program product which avoid the aforesaid disadvantages.

The invention consists of a computer-assisted furnishing of materials in elevator construction, wherein materials are provided with a readable or writable data transmitter, these materials are furnished, data of the data transmitter are written or read with computer assistance and these data are checked with computer assistance.

Advantageously, individual materials or components thereof and/or packaging of materials and/or a pallet of assembled materials is or are provided with a data transmitter. Advantageously, the data transmitter is a contactless chip card with data which are stored in a data store and which are read or written by a read/write device. Advantageously the data transmitter is an economically producible chip card in the form of a resilient film transponder which communicates on the basis of radio frequency (RF). The data transmitter can be read or written with computer assistance at any place in the net product chain during elevator construction, i.e. in the order processing, manufacture, supply, wholesaling, delivery, mounting and servicing of the materials.

Advantageously, the data are, for computer-assisted checking, compared with at least one checklist stored in at least one databank. The data read by the read/write device are communicated to at least one evaluating unit and compared by the evaluating unit with the checklist in accordance with at least one computer program product. The computer program product compares whether these data agree with corresponding details of the checklist. The evaluating unit issues a positive or negative response signal as the result of this checking.

With the invention the individual steps of the net product chain in elevator construction can be checked and quality can be increased at all stages of this net product chain. The details of the checklist stored in the databank lead to a transparency, which simplifies administrative structures.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
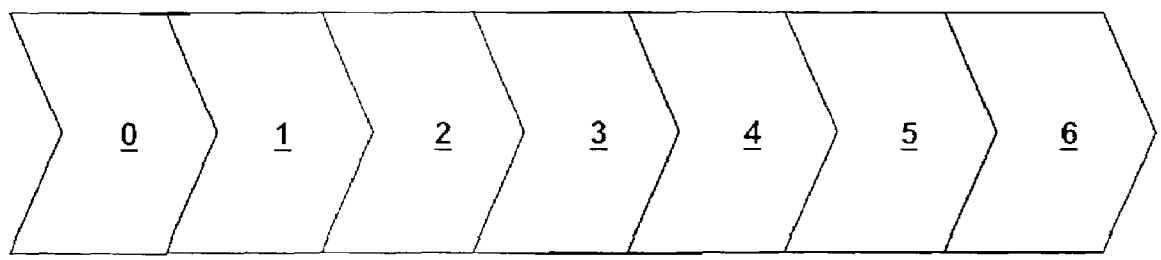
FIG. 1 shows a diagrammatic illustration of the method for computer-assisted furnishing of materials in elevator construction pursuant to the present invention.

FIG. 1 shows a net product chain consisting of order processing 0, manufacture 1, supply 2, wholesaling 3, delivery 4, mounting 5 and maintenance 6 of materials.

The materials used in elevator construction are of numerous kinds. Thus, materials such as guide rails, electric drives, cage components, cables, belts, control boxes, etc., are furnished. The materials are prepared at suppliers, supplied to wholesale warehouses, delivered from there to building sites and incorporated in elevator installations.

Advantageously, the data transmitter is a contactless chip card with data which are stored in a data store and which are read or written with computer assistance by a read/write device. The data transmitter is, for example, a transponder with transponder antennae and a transmitter electronic system. The data transmitter is supplied with an operating voltage by induction by way of an electromagnetic field. Such an electromagnetic field is irradiated by the read/write device. As soon as the data transmitter is disposed in the vicinity of the read/write device, it is supplied with energy and transmits data, by way of radio frequency, to the read/write device. According to the respective card type, ranges of the communication are realized from a few centimeters up to one meter and more. The read/write device transmits or receives the data by way of an appropriately constructed transmitting and receiving antenna. The read/write device can be constructed to be portable or stationary. The reading/writing takes place in contactless manner, even through materials or packages.

The transponders can be divided into passive and active forms, wherein the passive forms obtain their energy exclusively by the electromagnetic field built up by the read/write device and the active forms have an own energy supply for amplification of the data transmitted back by radio frequency, and are also divided into read-only, i.e. readable only, and into read/write i.e. readable and writable, variants. The different systems are moreover distinguished by the radio frequencies used, the constructional form ((adhesive) film, tube, plastic card or similar), the range in the write/read process and the reading speed. The basic information of a transporter is a programmable, worldwide specific numerical code; according to the respective embodiment, the transponders store further data; for example, in the case of read/write transponders, storage of date and time by the read/write device. Film transponders are particularly advantageous, since they are distinguished by low production costs, resilience of the film, simple application, insensitivity in handling and relatively high data transfer rates. In particular, such film tags are largely insensitive relative to soiling and painting at the building site.

With knowledge of the present invention, any desired readable or writable data transmitters or read/write devices can be realized. Thus, data transmitters which communicate contactlessly on the basis of light with a read/write device such as a scanner are equally usable. Data transmitters in the form of magnetic cards, electronic chips, etc., which communicate with a read/write device by way of at least one intermediary contact, are also usable.

For the computer-assisted checking of the data, details are stored in a checklist of a databank. These details correspond with the data or these details and data are associated with one another. The databank is, for example, a relational databank.

An evaluating unit is provided for the computer-assisted reading/writing of the data or for the computer-assisted checking of the data. The evaluating unit is a commercially available computing unit with inputs and outputs for communication with a read/write device or with the databank. For example, the communication takes place in accordance with a known standard protocol such as the Internet protocol (TCP/IP) by radio and/or cable and/or telephone. The evaluating unit can be constructed to be portable or fixed. The evaluating unit, databank and read/write device can be integrated in a single housing, but they can also be separately placed at different locations.

Advantageously, a computer program product embodied in a readable medium is installed in the evaluating unit. With advantage, the computer program product operates in several modes such as configuration mode, production mode, storage mode, delivery mode, mounting mode and maintenance mode, which modes correspond with the stages of the net product chain. The computer program product thus has access to read information and to the details of the checklist. The computer program product compares read data with details of the checklist. Advantageously, this comparison takes place in accordance with known logic gates such as AND, OR, NOT, etc.

Known and proven input and output means such as a display, a keyboard, a loudspeaker, etc, are integrated in the read/write device or in the evaluating unit. In the case of correct identification or in the case of non-agreement, a positive or negative response signal is issued, for example, optically on a monitor or acoustically by way of a loudspeaker. The response signal can also consist in an output of the read data. The computer program product can undertake an interrogation. The issue of such an interrogation can take place optically on the monitor. The acknowledgement of the interrogation, for example by YES/NO, can be effected by way of a keyboard or a monitor with functional surfaces (touch screen).

In the case of the order processing 0, details with respect to the requisite materials, the delivery periods, the number or distribution of pallets, etc., are stored in the checklist. The computer program product writes these details in a configuration mode into the checklist.

The materials are advantageously provided with a data transmitter in production 1. For example, the data transmitter is incorporated in the materials or applied to the materials. The data transmitter comprises a data store with production-relevant data for specific association of the materials, such as production number, batch number, production date, production variant, etc. These data are used for production control and allow checking of the course of the production 1 of the materials. In particular, these data allow a quality control during the production 1 of the materials.

The materials are assembled from several components in the production 1. Consequently, details are present in the checklist that a first component—which has a first production number—is to be combined with a second component—which has a second production number. In the production 1, the production numbers are read and communicated to the evaluating unit. The computer program product compares, in a production mode, the correct combination of the components to form materials. For this purpose the read production numbers are compared with the checklist. For example, the sequence of read production numbers is compared with a corresponding sequence of production numbers in the checklist.

Advantageously, the produced materials are packaged at the suppliers and the packages are provided with data transmitters. For example, the data transmitter is incorporated in the packages or applied to the packages. Supply-relevant data about the content of the packages is written into the data stores of the data transmitters of the packages. For example, data with respect to the content and number of the materials, the production members thereof, batch numbers, production dates, production variants, the envisaged supply date, the weight of the packages, etc., are stored.

In a supply 2 the packages are dispatched to the wholesale warehouse. Advantageously, the data are read or written at the time of entry into the wholesale warehouses. These supply-relevant data are advantageously stored in the checklist. The data are able to be further processed. For example, the computer program product in a storage mode compares the materials that have entered with a corresponding acquisition order according to the checklist. This allows checking of the completeness of the received materials. In addition, the computer program product actualizes the data stored in the data stores of the materials or packages. For example, data concerning the actual supply date as well as a storage number are written into the data stores of the data transmitters. Such actualized data are advantageously similarly stored as details in the checklist.

Advantageously, materials or unpacked materials are assembled at the wholesaler 3 from the wholesale stock in order to be delivered on pallets to a building site. The pallets are advantageously provided with data transmitters. Logistics-relevant data are written into the data store of the data transmitter of a pallet. For example, data concerning the wholesale number, the point of distribution at a building site, etc., are stored. These logistics-relevant data can obviously also be stored in the data transmitters of the materials or packages of the products. Advantageously, the computer program product assembles the materials, which are to be delivered, in accordance with the checklist and stores these logistic-relevant data as details in the checklist.

In the delivery 4 to the building site the logistics-relevant data of the data stores of the data transmitters of the pallets are read and compared with the checklist. For example, five elevator installations are installed at five distribution points at the building site and ten pallets are delivered for each elevator installation. Through detection of the logistics-relevant data directly at the delivery, the fifty delivered pallets can be immediately placed at the intended distribution points and the completeness of the delivery checked i.e. deficiencies in the wholesale stock queried. The logistics-relevant data are read and output. The computer program product compares, in a delivery mode, the read data with details of the checklist. A reception report of the delivery 4 can—analogously to a radio report (SMS) or an Internet E-mail—take place in the delivery mode. Advantageously the computer program product executes an interrogation such as: Please confirm the completeness of the supplied materials. The interrogation is acknowledged.

For the mounting 5 of the elevator installation, the materials delivered in the pallets are specifically identified on the basis of the information in the data stores of the data transmitters in the pallets. These data are used for control in the mounting and allow checking of the progress of mounting 5 of the elevator installation. In particular, these data allow a quality control during the mounting 5 of the elevator installation.

The elevator installation is installed with use of several materials. In the checklist there are accordingly present details such as that a first material—which has a first production number is to be combined with a second material—which has a second production number. In the mounting 5 the production numbers are read and communicated to the evaluating unit. The computer program product compares, in a production mode, the correct combination of the materials. For this purpose, the read production numbers are compared with the checklist. For example, the sequence of the read production numbers is compared with a corresponding sequence of production numbers in the checklist. It is possible through communication of the data to a central unit to monitor the construction progress and to actualise plans for deployment of personnel.

For the maintenance 6 of the elevator installation the data in the data stores of the data transmitters of the incorporated materials are read and compared with the checklist. Advantageously, all data important for the maintenance or the replacement and a reordering are written as maintenance-relevant data in the data store. For example, the production numbers, production dates and production variants of the materials are read. The computer program product compares, in a maintenance mode, the read data with details of the checklist. Advantageously, the checklist contains an installation documentation or communicates with an installation documentation. Defective materials or components can thus be specifically identified and the correct replacement parts can be automatically reordered. Advantageously the reordering is carried out in the maintenance mode. The computer program executes, for example, an interrogation such as: Will you reorder these materials identified as defective? The interrogation is acknowledged.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A method for computer-assisted furnishing of materials for elevator construction, comprising the steps of: generating a checklist stored in a databank with details concerning materials to be furnished to an elevator construction site, said checklist comprising production-relevant data and supply-relevant data; providing individual components with a readable or writable data transmitter; reading or writing data of said data transmitters with computer assistance; writing production-relevant data into said data transmitters of said individual components; assembling at least one of the materials to be furnished from several components by comparing production-relevant data of data transmitters of said components with details of said checklist; providing at least one of a package of materials and a pallet of materials with a readable or writable data transmitter; reading or writing data of said data transmitters on the package or pallet of materials with computer assistance; writing supply relevant data in the data transmitter of said at least one of a package of materials and a pallet of materials; gathering at least one of the materials to be furnished to an elevator construction site in a warehouse on said at least one of a package of materials and a pallet of materials by comparing supply-relevant data of data transmitters of said at least one of a package of materials and a pallet of materials with details of said checklist; furnishing said at least one of a package of materials and a pallet of materials to the elevator construction site based upon said supply-relevant data; and, at the elevator construction site, checking completeness of furnished materials by comparing supply-relevant data of data transmitters of said at least one of a package of materials and a pallet of materials with details of such checklist.

2. A method according to claim 1, further including comparing production numbers of said production-relevant data with the details of said checklist to determine whether there is a correct combination of said components to form materials.

* * * * *